United States Patent [19]

Adler et al.

[11] 3,824,352

[45] July 16, 1974

[54] STACKED PIEZOELECTRIC TRANSDUCER ACTING AS QUARTER-WAVE RESONATOR FOR RECORDING VIDEO INFORMATION

[75] Inventors: Robert Adler, Northfield; Roger W. Knitter, Hoffman Estates, both of Ill.

[73] Assignee: Zenith Radio Corporation, Chicago, Ill.

[22] Filed: Apr. 30, 1973

[21] Appl. No.: 355,392

[52] U.S. Cl.... 179/100.41 P, 178/6.6 A, 178/6.6 B, 179/100.4 C, 310/8.2, 310/8.3, 310/9.5, 310/9.6

[51] Int. Cl..... G11b 3/00, H04r 17/04, H01v 7/00

[58] Field of Search........ 178/6.6 A, 6.6 B, 6.6 DD; 179/100.4 C, 100.41 B, 100.41 P; 310/8.2, 8.3, 8.7, 9.5, 9.6

[56] References Cited

UNITED STATES PATENTS

| | | | |
|---|---|---|---|
| 1,525,823 | 2/1925 | Nicolson | 179/100.41 P |
| 2,188,687 | 1/1940 | Lohn | 179/100.4 C |
| 2,245,178 | 6/1941 | Bechmann | 310/9.6 |
| 2,636,134 | 4/1953 | Arons et al. | 310/8.7 |
| 3,286,043 | 11/1966 | Wagner | 179/100.41 P |
| 3,614,488 | 10/1971 | Sonderegger | 310/8.7 |
| 3,652,809 | 3/1972 | Dickopp et al. | 179/100.41 P |

*Primary Examiner*—Bernard Konick
*Assistant Examiner*—Stewart Levy
*Attorney, Agent, or Firm*—Cornelius J. O'Connor; John J. Pederson

[57] ABSTRACT

A recording head for applying a video program to a record disc employs a transducer having a plurality of planar piezoelectric elements united in a stack arrangement which collectively exhibits a predetermined acoustic impedance. A base member, bonded to one terminus of the stack, has a specific impedance at least an order of magnitude greater than the stack impedance so that the stack operates substantially as a quarter-wave resonator. An energizing signal applied to the stack develops longitudinal mode vibratory displacements of the stack proportional to the excursions of the energizing signal. A coupler, bonded to a second terminus of the stack, translates the vibratory displacements to a stylus which generates a pattern on an impressionable surface of the record disc.

12 Claims, 5 Drawing Figures

STACKED PIEZOELECTRIC TRANSDUCER ACTING AS QUARTER-WAVE RESONATOR FOR RECORDING VIDEO INFORMATION

BACKGROUND OF THE INVENTION

This invention relates in general to the field of video recording and in particular to a recording head for recording video signals upon a disc.

The use of the television receiver as an educational tool, as well as in its more recent role as an instrument for permitting the viewer to select and display program material of his own choosing, have instituted a demand for an economical and efficient means for storing video material for subsequent playback on a television receiver. Insofar as storage of video information is concerned, the art resorts to film, magnetic tape and record discs. As respects the last mentioned medium, the economy of a vinyl disc from the standpoint of material cost, as well as the relative ease with which it can be replicated, highly recommends it to video recording.

In disc recording the video information is stored in the form of a pattern which may be applied to the original recording by cutting or embossing its surface with a stylus. Specifically, the encoded video information (for example, in the form of a frequency modulated signal) drives an electro-mechanical transducer which converts that signal to mechanical vibrations which are coupled to the stylus. In the case where a master is "cut" the stylus actually removes material from the surface to generate a groove. On the other hand, the information can be stored without removing material by embossing the surface of the master, that is, by using the stylus to form a pattern of indentations.

The procedure herein considered for cutting a video disc is similar to at least one process employed in cutting high fidelity audio records to the extent that an electro-mechanical transducer is used. However, while the procedures may bear similarity, problems peculiar to video recording dictate that new techniques and approaches be employed. More particularly, the information, in terms of frequency bandwidth, that must be recorded in order to store a video program is greater by at least two orders of magnitude than that required for recording audio material. Specifically, the upper frequency response for transducers employed in audio recording need not exceed 20 KHz. On the other hand, assuming practical signal processing techniques are used, a video recording transducer should be capable of a frequency response at least an order of magnitude greater than that encountered in audio recording.

To accommodate the information necessary for reproducing a picture of acceptable resolution, consonant with a reasonably long playing time, the pattern applied to the record surface must constitute a multitude of extremely fine and closely spaced grooves or tracks. In a "cut" video master, for example, the depth of the grooves will vary around a nominal value, typically 1 $\mu$m, the amplitude of the variation typically $\pm 0.15$ $\mu$m, while the spacing between adjacent grooves is in the order of 2 to 3 $\mu$m. By way of comparison the groove depth in a high fidelity audio record approaches 23 $\mu$m with groove lateral spacing approximately 100 $\mu$m. Manifestly, recording transducers designed for use in the audio field are incapable of accomplishing video recording.

OBJECTS OF THE INVENTION

It is therefore a general object of the invention to provide an improved recording head for use in a video disc recorder.

It is a specific object of the invention to provide a transducer arrangement for a video recording head which arrangement is characterized by an extended frequency range in conjunction with an attractive operating efficiency.

SUMMARY OF THE INVENTION

A recording head for applying a pattern to a record having an impressionable surface comprises a transducer comprising a plurality of polarized substantially planar piezoelectric elements each having a first electrode associated with one pole of the element and a second electrode associated with an opposite pole of the element. The elements are united in a stack arrangement, with adjacently positioned ones of the elements having oppositely directed polarizations, to collectively exhibit a predetermined acoustic impedance. A base member, bonded to one terminus of the stack, has a specific acoustic impedance at least an order of magnitude greater than that of the stack impedance so that the stack operates substantially as a quarter-wave resonator. Circuit means, including means for establishing a first conductive connection common to the first electrodes and for establishing a second conductive connection common to the second electrodes, are provided for applying an electrical signal across the elements to develop longitudinal mode vibratory displacements of the stack proportional to the excursions of the electrical signal. A coupler is bonded to a second terminus of the stack for translating the stack displacements. Finally, a stylus, supported by the coupler for presentation to the impressionable surface of the record and responsive to the stack displacements translated by the coupler, is provided for generating a pattern on that surface corresponding to the vibratory displacements of the stack.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings, and in the several figures of which like reference numerals indicate like elements and in which:

FIGS. **2*a* and 2*b* are details of a piezoelectric element employed in the transducer of FIG. 2.

DESCRIPTION OF A PREFERRED EMBODIMENT

Figure 1:
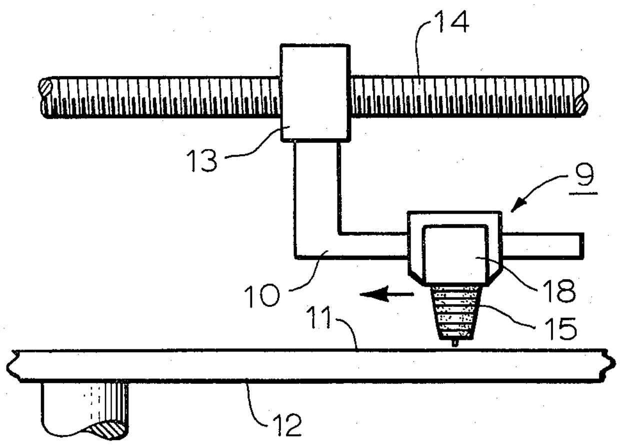
FIG. 1 is an elevational view of a video recording head constructed in accordance with the invention.

A video recording head 9 for applying a pattern to a record disc is shown in FIG. 1 as supported by an arm 10 for presentation to the impressionable surface 11 of a record disc 12 supported for rotation about a vertical axis. Arm 10 is suspended from a carriage 13 that serves to effect a precisely controlled inwardly directed radial travel of the head across the disc. In practice, carriage 13 is associated with the cross-feed mechanism 14 of a precision record cutting lathe, the details of which carriage and lathe form no part of the subject invention and, thus, are omitted. A lathe of the type adverted to above, and one in which the subject recording head has been successfully used, is available from Neumann Gmbh. of Berlin, West Germany under the model designation AM131.

Figure 2A:
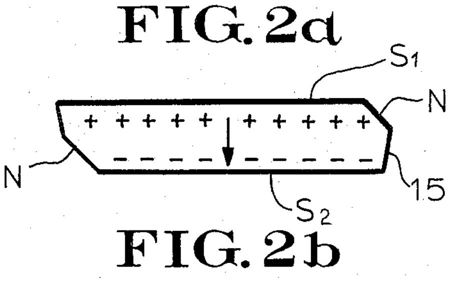
FIG. 2 is an enlarged representation of the transducer portion of the recording head shown in FIG. 1.
Figure 2B:
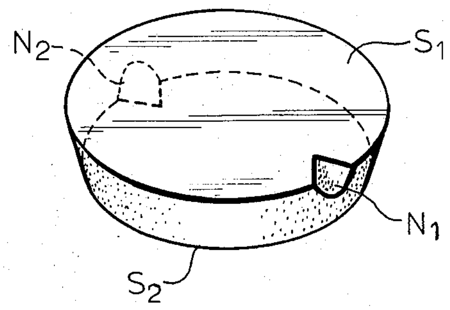
Figure 2:
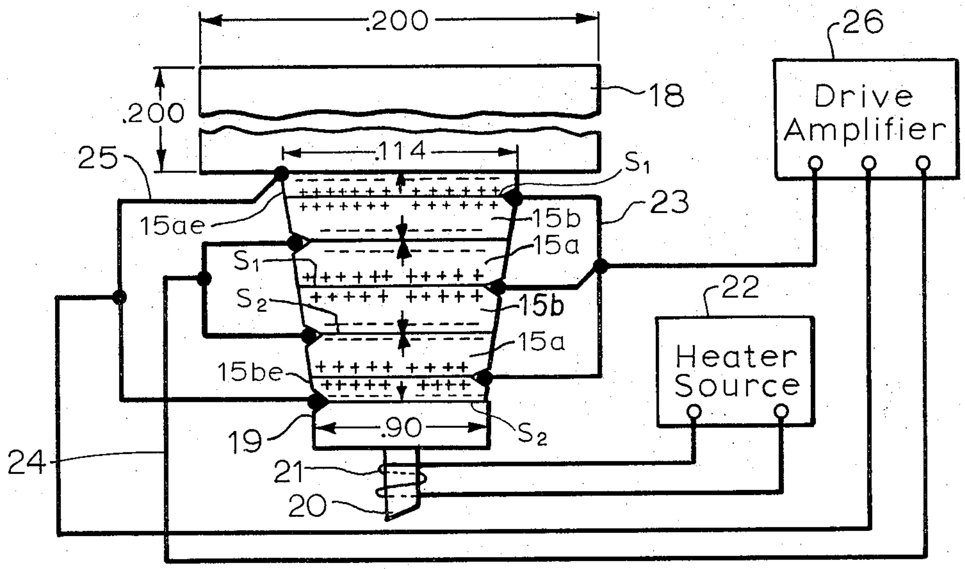

Turning now to a more detailed description of the recording head, see FIG. 2, this device is seen to comprise a transducer 15 formed of a plurality of polarized substantially planar piezoelectric elements of which those designated 15*a*, 15*b* are of substantially equal thickness while the end elements, 15*ae*, 15*be* have a thickness approximately one-half that of the elements disposed between them. In the disclosed embodiment a total of four elements are interposed between end elements 15*ae*, 15*be*. In any event, and irrespective of their dimensions, each element adopts a circular wafer-like construction having an equipotential surface or electrode $S_1$ associated, for example, with the positive pole of the element and a second electrode $S_2$ associated with the opposite or negative pole of the element. In order to identify the characteristic polarization of each element, those sharing the subscript *a* in their reference numeral have a like polarization while those sharing the subscript *b* have a like, but opposite polarization. More particularly, and as shown in FIGS. 2 and 2*a*, each of the elements is polarized across its thickness dimension with elements 15*a*, 15*ae* being polarized in a predetermined sense and designated by an upwardly directed arrow while elements 15*b*, 15*be* are polarized in an opposite sense and therefore are identified by a downwardly directed arrow. The nature of each piezoelectric element is such that the application of an electrical signal thereacross produces a longitudinal extension or compression of the element, depending upon the polarization of the element and the polarity of the applied signal. Of course, under excitation from an alternating signal these extensions and compressions are manifested as vibrations which are proportional to the excursions of the excitation signal. The elements can be formed from a piezoelectric ceramic such as PZT-8 which is a trade designation for a particular type of lead zirconate titanate material available from Vernitron Corporation.

As shown in FIG. 2, elements 15*a*, 15*b* are interleaved in a stack arrangement with elements 15*ae*, 15*be* each forming a terminus of the stack. The elements are united or bonded together in a stack with each $S_1$ electrode in contact with an $S_1$ electrode and with each $S_2$ electrode similarly arranged to the end that the stacked elements add their displacements and collectively exhibit a predetermined acoustic impedance.

Preferably, the transducer is arranged as a tapered stack with the lower-most element 15be of an elemental or small cross-section while the upper most element 15ae is characterized by a predetermined enlarged cross-sectional area. In a specific construction of the invention, the taper of the transducer stack is inclined 8 ½° from the vertical which taper is achieved in a construction wherein element 15be has a diameter of .090 ± .001, the uppermost element has a diameter of .114 ± .001 inch and the overall height of the stack is .080 ± .005 inch. Insofar as the height of the stack is concerned, this dimension is established by tailoring each of elements 15*a*, 15*b* to have a thickness of .016 ± .001 inch and by tailoring each of the end elements 15*ae*, 15*be* to have a thickness of .008 ± .0005 inch.

The formation of the transducer stack will now be discussed. First, a quantity of piezoelectric elements are polarized and then sliced to predetermined thickness and diameter dimensions. The oppositely disposed surfaces of each wafer are then plated with a 500A coating of chromium upon which a 2000A coating of gold is overlaid. At this stage, one wafer is indistinguishable from another, insofar as its polarization is concerned, therefore the wafer must be marked in order to identify its sense of polarization. For this purpose the surface of each wafer that would exhibit a positive surface electrification when subjected to pressure is designated its positive electrode $S_1$ and is thereafter identified by the outer gold coating. The other surface of the wafer, which, of course is the negative electrode $S_2$, is given an additional 500A coating of chromium, thus visually distinguishing that electrode from $S_1$.

For the stack arrangement shown in FIG. 2, four wafers 15*a*, 15*b* are selected and arranged so that elements having oppositely directed polarizations are disposed adjacent to each other. Two half size wafers 15*ae*, 15*be* are selected to serve as end terminals of the stack. All the wafers are temporarily bonded together by wax to form a stack which is then tapered by turning it down on a lathe until an 8 ½° tapered is obtained. The piezoelectric wafers are then separated and a notch is cut in each electrode $S_1$, $S_2$ of each wafer. More particularly, each wafer is provided with a first notch $N_1$ at one edge of electrode $S_1$ and with a diametrically positioned second notch $N_2$ in the edge of electrode $S_2$, see FIG. 2b. Electrode notches $N_1$, $N_2$ are then coated with chromium and gold to extend the conductive surfaces of electrodes $S_1$ and $S_2$ into those areas. The elements are then arranged in the manner shown in FIG. 2 with notches $N_1$ paired in a confronting relation and with notches $N_2$ paired in like fashion. The elements are then bonded together with an epoxy such as Araldite 6005.

The recording head further comprises a base member 18, in the form of a tungsten rod, which is bonded to element 15ae of the stack. Tungsten rod 18 is characterized by a specific acoustic impedance that is at least an order of magnitude greater than the acoustic impedance of the stack. By virtue of that property, and in a manner discussed in greater detail below, the tungsten rod causes the transducer stack to operate substantially as a quarter-wave resonator. A coupler 19, which can comprise a wafer of alumina, is bonded to element 15*be*, for the purpose of translating the displacements or vibrations of the stack to a stylus 20, which, in turn, transmits the displacements to the impressionable surface 11 of the record disc to generate a pattern thereon corresponding to those displacements. In cutting or embossing a disc it is often desirable to heat the stylus to facilitate such cutting. This is achieved by winding a heating coil 21 around the stylus and returning it to an energizing source 22.

Electrical circuit means, including means in the form of conductive leads, are provided for establishing a first conductive connection 23 common to electrodes $S_1$ and a second conductive connection 24 common to electrodes $S_2$. Connnections 23, 24 are conductively bonded to pairs of confronting notches $N_1$, $N_2$, respectively, by a bead of conductive epoxy such as Eccobond 56C. A third circuit connection 25 comprising a ground connection, is provided to insure that end elements 15ae, 15be of the stack are maintained at zero potential. Circuit connections 23, 24 and 25 are returned to a drive amplifier 26 for the purpose of applying a slowed down encoded video signal across the transducer so that, by virtue of the orientation of the elements, all elements are uniformly excited and thus develop longitudinal mode vibratory displacements of the transducer stack which are proportional to the excursions of the video signal. Coupler 19, as noted, translates the stack displacements to stylus 20.

In operation, stylus heating coil 21 is energized and then a slowed down encoded video signal is applied across electrodes $S_1$ and $S_2$ of transducer stack 15 to develop longitudinal mode vibrations of the stack which correspond to that signal in frequency and in amplitude. The transducer stack has a natural resonant frequency which is determined by the type of piezoelectric material, the number of elements in the stack, the thickness of the elements and, to some extent, the taper of the stack. Actually, the taper contributes to an increase in the resonant frequency. Additionally, tapering the stack contributes to greater mechanical stability in that it reduces the effect of resonances in undesired modes.

Accordingly, with the resonant frequency of a given transducer determined by its parameters, it becomes important to derive the maximum output from the transducer commensurate with a given driving power. The drive voltage required to produce a given displacement in the multi-element transducer described here is much smaller than that voltage which would be required to produce the same displacements in a single-element transducer. This occurs because, in a multi-element transducer, all the elements are effectively in parallel thus accounting for the lower voltage requirement, note that the electric field is the same in both cases. Furthermore, while a higher voltage is required to drive a single element transducer, a multi-element transducer requires greater driving current. The volt-amperes required are the same in both the single element and the multi-element transducers, however, the amplifier requirements for driving the transducer are simplified when the voltage is reduced. Also, arc-over in the comparatively low voltage multi-element arrangement is substantially precluded.

Figure 3:
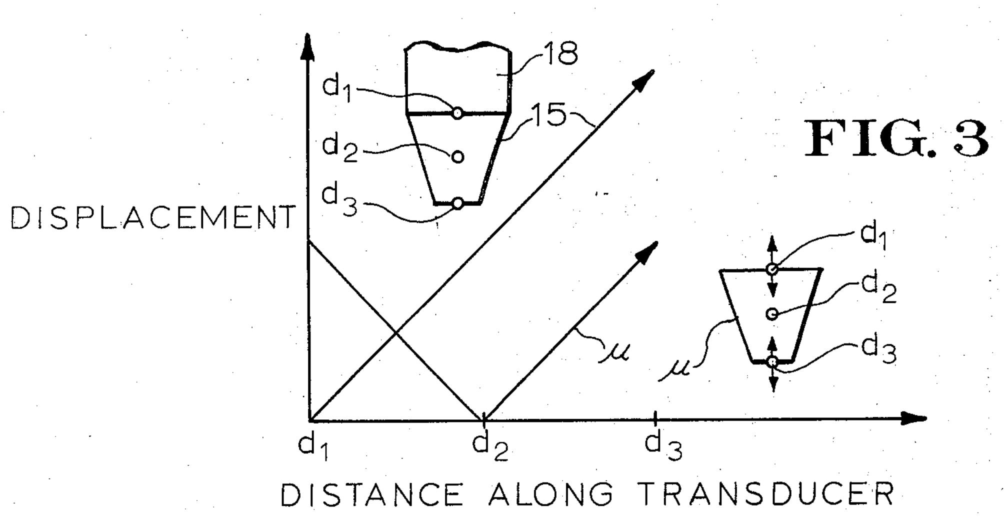
FIG. 3** shows a series of graphs, together with schematic representation of transducers, depicting the response of those video recording heads to an electrical signal.

It will now be shown how the disclosed arrangement of a terminated high frequency record cutting transducer achieves a substantially increased output over that attainable with a conventional transducer. Consider first the longitudinal displacement of a conventional transducer that is terminated in air, or very close to a zero acoustic impedance. A transducer of that type, is schematically represented in FIG. 3 and is designated U. As shown, when transducer U is excited, irrespective of whether it is a segmented or a unitary device, longitudinal expansions and contractions are generated at its extremities, $d_1$ and $d_3$ while its center $d_2$ remains relatively motionless. This action is represented in FIG. 3 by the double-headed arrows and by the curve labeled U which graphically depicts the displacement of portions of transducer U as a function of distance along the device. As shown, there is maximum displacement at the extremities and zero displacement at the center.

Attention is now directed to transducer 15 and it will be assumed, for purposes of discussion, that it has the same physical attributes as tranducer U except, of course, that transducer 15 is terminated by tungsten rod 18. This rod, by virtue of its high specific acoustic impedance, causes transducer 15 to function as a quarter-wave resonator. As a result that end $d_1$ of the transducer adjacent rod 18 is rendered substantially immobile and, therefore, the maximum longitudinal displacement of the free end $d_3$ is substantially twice that of either end of transducer U. This action is graphically depicted by the double headed arrows and the curve designated 15 in FIG. 3. A transducer constructed in accordance with the teachings herein has been operated at frequencies upwards of 300KHz for cutting a master recording. The quality of the tracks cut by this transducer has been such as to permit the replication of usable video discs from that master.

While transducer 15 has been depicted as comprised of six elements, it is appreciated that a transducer comprising a greater or lesser number of elements and terminated in the manner described herein can be employed for producing high quality video discs. The frequency requirements to be met in particular application will, of course, dictate not only the number of elements but also their physical dimensions.

While a particular embodiment of the invention has been shown and described, it is appreciated that modifications may be made to that embodiment, and it is intended in the appended claims to cover all such modifications as may fall within the true spirit and scope of the invention.

We claim:

1. A recording head for applying a pattern to a record medium having an impressionable surface, said head comprising:

a transducer comprising a plurality of polarized substantially planar piezoelectric elements each having a first electrode associated with one pole of said element and a second electrode associated with the opposite pole of said element, said elements united in a stack arrangement with adjacently positioned ones of said elements having oppositely directed polarizations and collectively exhibiting a predetermined acoustic impedance;

a base member bonded to a first terminus of said stack and having a specific acoustic impedance at least an order of magnitude greater than said stack impedance so as to establish said stack substantially as a quarter-wave resonator;

circuit means, including means for establishing a first conductive connection common to said first electrodes and for establishing a second conductive connection common to said second electrodes, for applying an electrical signal across said elements to develop longitudinal mode vibratory displacements of said stacked elements proportional to the excursions of said signal;

a coupler bonded to a second terminus of said stack for translating said stack displacements; and a stylus supported by said coupler for presentation to the impressionable record medium surface and responsive to the stack displacements translated by said coupler for generating a pattern on said surface corresponding to said displacements.

2. A recording head as set forth in claim 1 in which said transducer elements individually increase in size, progressively, from an elemental cross-sectional area to a predetermined enlarged cross-sectional area.

3. A recording head as set forth in claim 2 in which each of said transducer elements comprises a substantially circular wafer of piezoelectric material.

4. A recording head as set forth in claim 2 in which said base member is bonded to one surface of that transducer element having said predetermined enlarged cross-sectional area.

5. A recording head as set forth in claim 2 in which said coupler is bonded to one surface of that transducer element of elemental cross-sectional area.

6. A recording head as set forth in claim 1 in which, effectively, one-half of said elements are polarized in a predetermined sense and the other half are polarized in an opposite sense.

7. A recording head as set forth in claim 1 in which the end elements of said stack have a thickness substantially one-half that of the other elements.

8. A transducer head as set forth in claim 7 in which said end elements are oppositely polarized.

9. A transducer head as set forth in claim 7 in which said end elements are similarly polarized.

10. A recording head as set forth in claim 1 which further includes means for heating said stylus.

11. A recording head as set forth in claim 1 in which said base member comprises a tungsten rod.

12. A recording head as set forth in claim 1 in which said coupler comprises a wafer of alumina.

* * * * *